(12) United States Patent
Lupovka

(10) Patent No.: US 8,756,821 B2
(45) Date of Patent: Jun. 24, 2014

(54) METHOD AND APPARATUS FOR AZIMUTH DETERMINATION

(75) Inventor: Valery Lupovka, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 232 days.

(21) Appl. No.: 13/141,106

(22) PCT Filed: Oct. 26, 2010

(86) PCT No.: PCT/RU2010/000623
§ 371 (c)(1),
(2), (4) Date: Apr. 25, 2012

(87) PCT Pub. No.: WO2012/033429
PCT Pub. Date: Mar. 15, 2012

(65) Prior Publication Data
US 2012/0198710 A1    Aug. 9, 2012

(30) Foreign Application Priority Data
Sep. 7, 2010    (RU) ................................. 2010137011

(51) Int. Cl.
*G01C 1/08*    (2006.01)
(52) U.S. Cl.
USPC .......................................................... 33/268
(58) Field of Classification Search
USPC .......................................................... 33/268
See application file for complete search history.

(56) References Cited

U.S. PATENT DOCUMENTS

| | | | | |
|---|---|---|---|---|
| 240,849 | A * | 5/1881 | Saegmuller | 33/268 |
| 2,508,027 | A * | 5/1950 | Hoffmeister | 33/1 SA |
| 3,290,933 | A * | 12/1966 | Lillestrand et al. | 73/178 R |
| 3,968,570 | A * | 7/1976 | Leuchter, Jr. | 33/267 |
| 4,136,955 | A * | 1/1979 | Aeschlimann et al. | 356/139.1 |
| 4,138,826 | A * | 2/1979 | Inge | 33/268 |
| 4,449,817 | A * | 5/1984 | Abler | 356/145 |
| 4,702,011 | A * | 10/1987 | Sigley | 33/268 |
| 4,763,418 | A * | 8/1988 | Decker, Jr. | 33/268 |
| 5,276,972 | A * | 1/1994 | Staney | 33/271 |
| 7,339,731 | B2 * | 3/2008 | Baun et al. | 359/429 |
| 7,471,211 | B2 * | 12/2008 | Lemp, III | 340/815.4 |
| 2007/0283583 | A1 * | 12/2007 | Subbiondo et al. | 33/268 |

* cited by examiner

*Primary Examiner* — Christopher Fulton
(74) *Attorney, Agent, or Firm* — Bardmesser Law Group

(57) ABSTRACT

A method of azimuth determination includes determination of local star time and latitude, where the azimuth determination unit is fixed at an object and oriented relative to the local horizon or the vertical; two or more celestial bodies with known coordinates are selected among visible celestial bodies and the line of sight is aimed at celestial bodies in turn, after that elevations over the horizon or zenith ranges to celestial bodies, horizontal angles between bodies are measured and measured times are recorded; and local star time, site latitude and azimuth are calculated. An apparatus for azimuth determination comprising an orientation unit to orient relative to the local horizon or the vertical line, an optical unit to aim at point light sources, a horizontal angle measurement unit, an elevation measurement unit, a time measurement unit and a computation unit, characterized in that orientation, aiming, angle and time measurement units are connected to a computation unit. The computation unit calculates azimuth, latitude and local star time based on horizontal and elevation angles of point light sources, such as celestial bodies, and measurement times.

24 Claims, 5 Drawing Sheets

METHOD AND APPARATUS FOR AZIMUTH DETERMINATION

CROSS-REFERENCE TO RELATED APPLICATIONS

This application is a U.S. National Phase of PCT/RU2010/000623, filed on Oct. 26, 2010, which is incorporated herein by reference in its entirety.

FIELD OF THE INVENTION

The present invention relates to methods and apparatus of determining heading azimuths, as well as to celestial navigation.

BACKGROUND OF THE INVENTION

A method of determining an azimuth using a celestial body, for example, Polaris, according to its hour angle, is known (see U.S. Pat. No. 1,942,548). The main drawback of this method is the need to know the latitude and longitude of the observer's position, and accurate registration of the instant of observation, using Universal Time.

Another method of determining the azimuth by measuring a horizontal angle between Polaris and an auxiliary star is also known (see U.S. Pat. No. 1,512,601). A limitation of this method is the need to know the site latitude.

The objective of the present invention is to eliminate these limitations.

BRIEF SUMMARY OF THE INVENTION

The objective of the invention is achieved by determining the azimuth by observing two or more celestial bodies with known coordinates. Some parameters are measured: horizontal angles between these celestial bodies and between the bodies and check points, as well as (vertical) elevation angles of celestial bodies and check points above the horizon, and measurement time instants.

An apparatus to implement the proposed method of determining the azimuth comprises: an orientation unit to be oriented relative to a local horizon or vertical line; an alignment unit to aim at observed point light source objects; a horizontal angle measurement unit; a vertical angle/elevation measurement unit; a time measurement unit; a computation unit connected to the alignment unit, the horizontal angle measurement unit, the elevation measurement unit and the time measurement unit.

One or more check points in the form of point light sources can be included in the apparatus. The check points can be selected from the scenery/landscape, or made as special light markers at a distance from the alignment unit that imitate celestial bodies in the process of measurements.

The orientation unit which orients relative to the local horizon or the vertical can be implemented as liquid levels or electronic tilt sensors.

The alignment unit is aimed at observed objects and can be implemented in the form of a diopter, a sighting telescope with crosshairs in its field of view, or a digital camera whose focal plane has a CCD array or another position image sensor.

The alignment unit is equipped with a mechanism for changing the line of sight direction, which allows the apparatus to be aimed at point light sources.

The horizontal angle measurement unit allows measuring horizontal angles between observed celestial bodies, and between the celestial bodies and check points, and can be made in the form of a reference circle or an angle-encoder transducer.

The elevation measurement unit measures elevations of observed objects relative to the horizon, and can be implemented as a reference circle or an angle-encoder transducer.

The time measurement unit is designed for measuring time intervals between the times of celestial body observations, and can be made in the form of a clock or a time-interval recorder.

The computation block calculates ephemerides for aiming at celestial bodies and determines local star time, position latitude and azimuth based on the observations.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
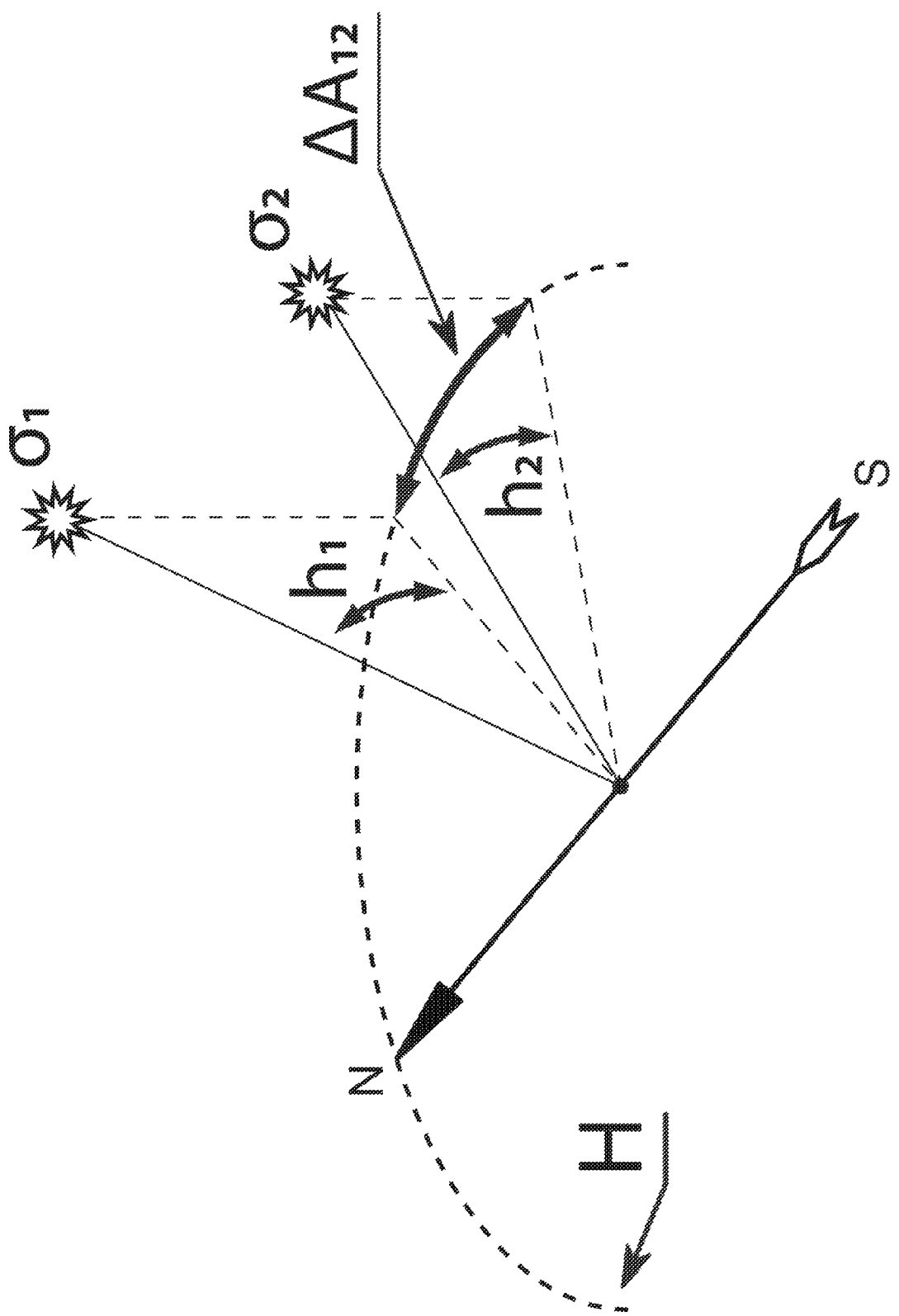
FIG. 1 shows a method of determining elevation angles over the horizon and horizontal angles between the celestial bodies.

FIG. 1 shows a method of determining elevation angles over the horizon and horizontal angles between the celestial bodies. In FIG. 1:

H is the horizon line, $\sigma_1$ and $\sigma_2$ are the celestial bodies in view;

$h_1$ and $h_2$ are the measured elevations over the horizon;

$\Delta A_{12}$ is the measured horizontal angle between celestial bodies.

Direction NS (North-South) shows the north-south line (direction of the local astronomical meridian). The apparatus of determining the azimuth is mounted and fixed on an object and oriented relative to the local horizon or the vertical $zz'$ from the zenith to nadir.

Among celestial bodies over the horizon two or more bodies $\sigma$ with known coordinates are chosen.

The apparatus line of sight is aimed at the celestial bodies in turn.

Elevation angles over the horizon hσ or celestial body zenith distances and horizontal angles between the celestial bodies ΔA are measured with simultaneous recording times of these measurements.

With the help of these measured parameters, local star time, latitude and azimuth are calculated.

To simplify measurements and compensate for sighting errors, the apparatus may be aimed at the point light source such that the point light source would be in the apparatus field rather than the apparatus is aimed exactly at the point light source. After that, an angle between the actual direction to the point light source and the apparatus line of sight is measured, and is taken into account in the computation.

To compensate for measurement errors, elevation angles or zenith distances and horizontal angles can be determined at specific settings of the measurement unit and aiming unit, then the settings of these units are changed and a new measurement set is produced for the same celestial bodies. The parameters (i.e., local star time, latitude and azimuth) are calculated using the two measurement sets.

To enhance the accuracy of determined parameters, the celestial bodies in view can be selected such that horizontal angles between them ΔA will be at least 60 but no more than 120 degrees. Also, to enhance the accuracy of determined parameters, the celestial bodies in view can be selected such that elevation angles over the horizon between them hσ will be at least 10 but no more than 80 degrees.

Time recording can be additionally done by accurate Universal Time, and in the process of computation, current position longitude can be additionally calculated for the current location.

Figure 3:
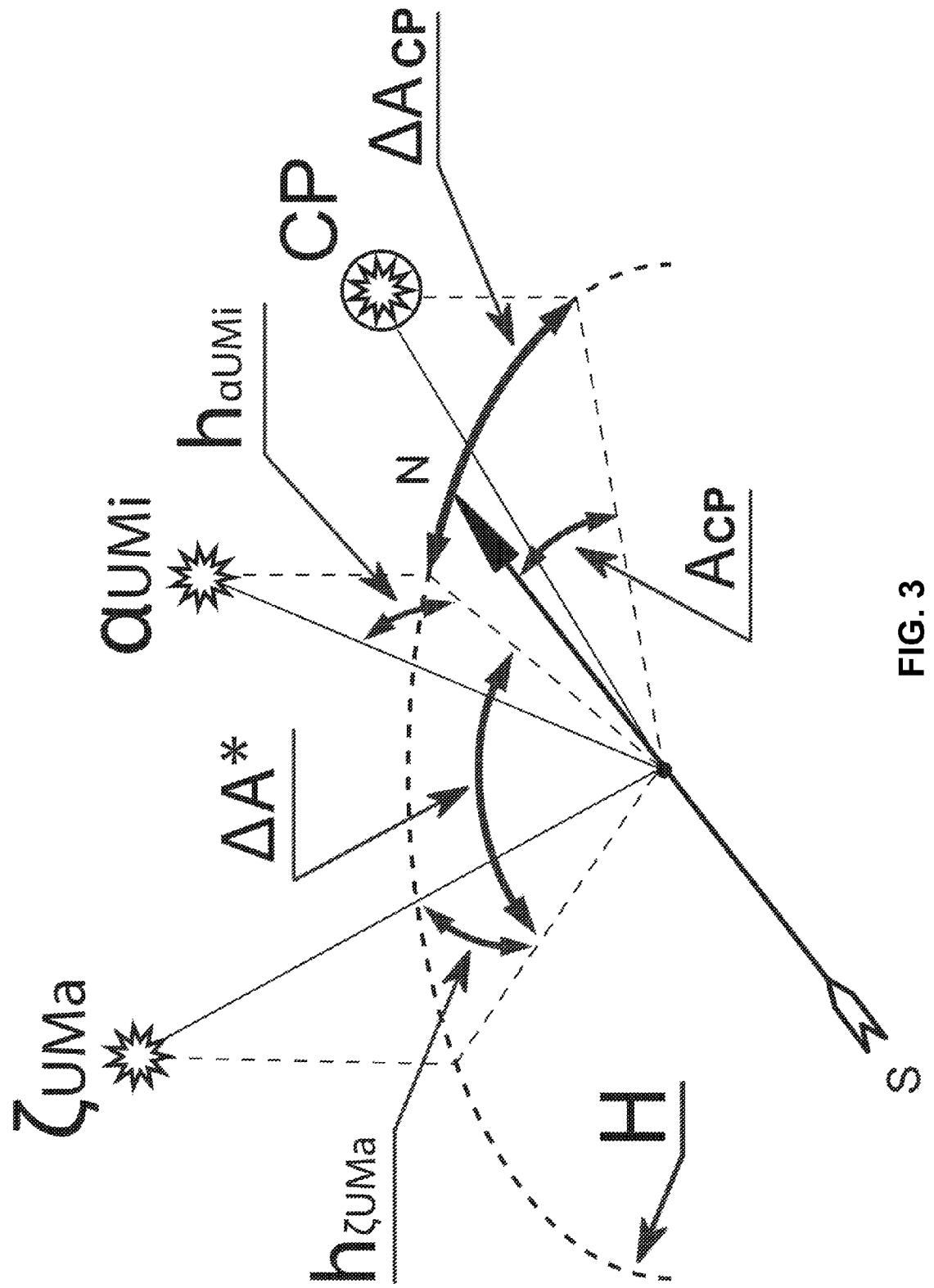
FIG. 3 shows a measurement method using a main and auxiliary celestial bodies.

FIG. 3 shows a measurement method using a main and auxiliary celestial bodies. In FIG. 3:

αUMi is the main celestial body from the circumpolar zone (in FIG. 3, it is the Polaris star), ζUMa is the auxiliary body (in FIG. 3, it is the Mizar star), $h_{\alpha UMi}$ and $h_{\zeta UMa}$ is the measured elevations of celestial bodies over the horizon;

ΔA* is the measured horizontal angle between main and auxiliary celestial bodies.

To increase accuracy of the parameters in question, one main celestial body is selected among visible bodies over the horizon in such a way that it would be located in the circumpolar zone, i.e., no farther than 10 degrees from Polaris, while all auxiliary celestial bodies can be at least 25 degrees farther from Polaris than the main one. Site latitude and azimuth are determined by the main celestial body, though.

To compensate for measurement errors, observations of celestial bodies can be done according to the following order: auxiliary celestial body—main celestial body—main celestial body—auxiliary celestial body.

Additional measurements can be done using one or more check points in the form of stationary point light sources that imitate celestial bodies whose heading azimuths are to be determined. Check points can be selected from the scenery (street lights, flash lights, beacons and so on) or can be intentionally installed at a distance from the aiming device.

Figure 2:
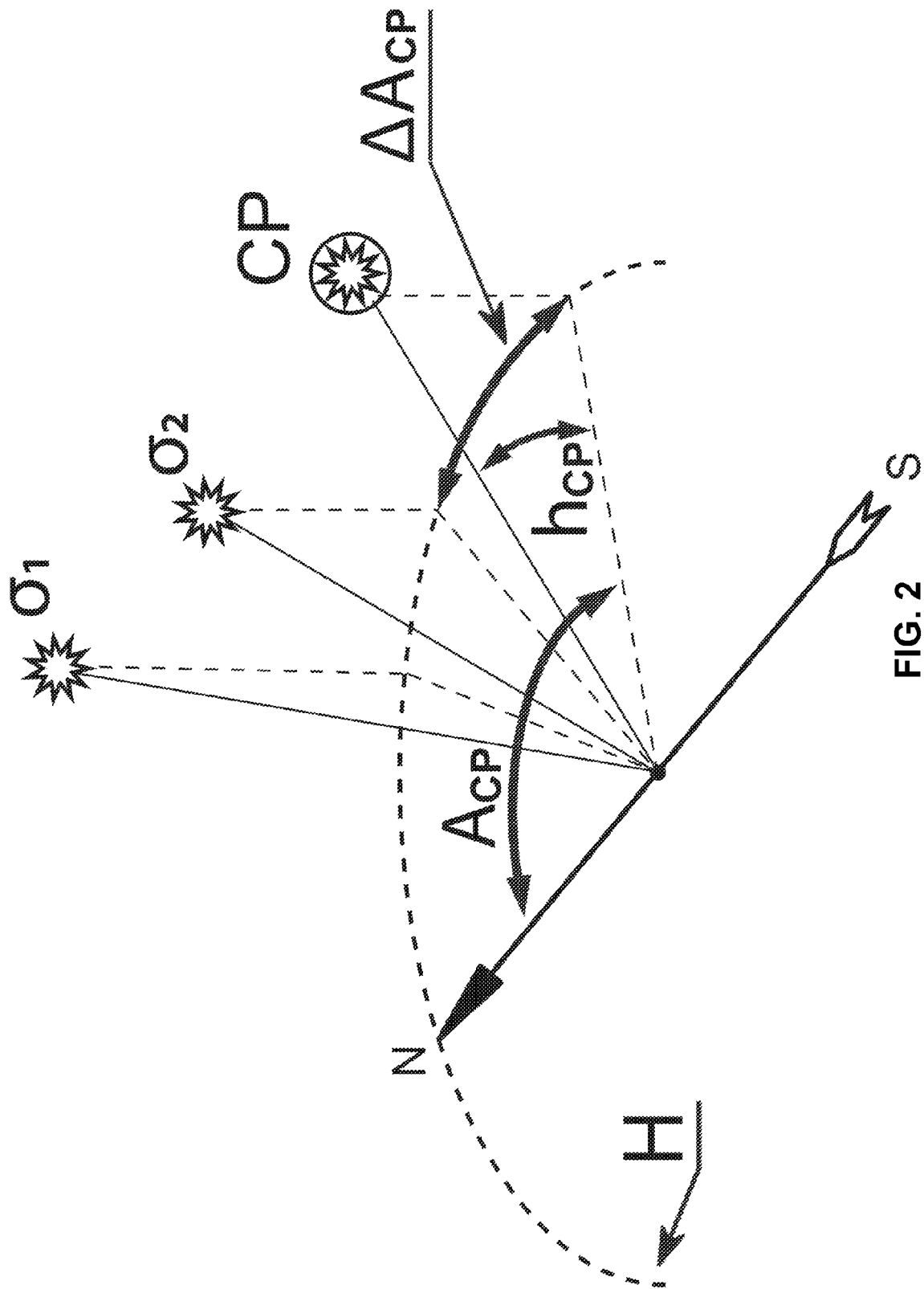
FIG. 2 shows a method of determining elevation over the horizon for a check point and determining a horizontal angle between celestial bodies and a check point.

FIG. 2 shows a method of determining elevation over the horizon for a check point and determining a horizontal angle between celestial bodies and a check point. In FIG. 2:

CP is the check point, $h_{CP}$ is the measured elevation of the check point over the horizon;

$\Delta A_{CP}$ is the measured horizontal angle between the celestial body and check point;

$A_{CP}$ is the determined azimuth of the check point.

The line of sight can be aimed at the check points, and horizontal angles between celestial bodies and check points, elevations or zenith distances to check points can be measured. At the same time, measurement time instants are recorded, and after measurements have been completed, heading azimuth to check points can be calculated.

To compensate for measurement errors, observation of celestial bodies and check points can be determined at specific settings of the measurement units and the aiming unit, then the settings of these units are changed and a new measurement set is produced for the same celestial bodies. The parameters (local star time, latitude and heading azimuth to check points) are calculated using the two measurement sets.

To compensate for measurement errors and increase accuracy of the determined parameters, one main celestial body is selected among visible bodies over the horizon in such a way that it would be located in the circumpolar zone, i.e., no farther than 10 degrees from Polaris, while all auxiliary celestial bodies can be at least 25-30 degrees farther from Polaris than the main one. Observation of celestial bodies and check points can be done in the following order: check point—auxiliary celestial body—main body—main body—auxiliary celestial body—check point.

To compensate for time measurement errors and speed up measurement process, two or more point light sources (celestial bodies and/or check points) can be synchronously observed.

Figure 4:
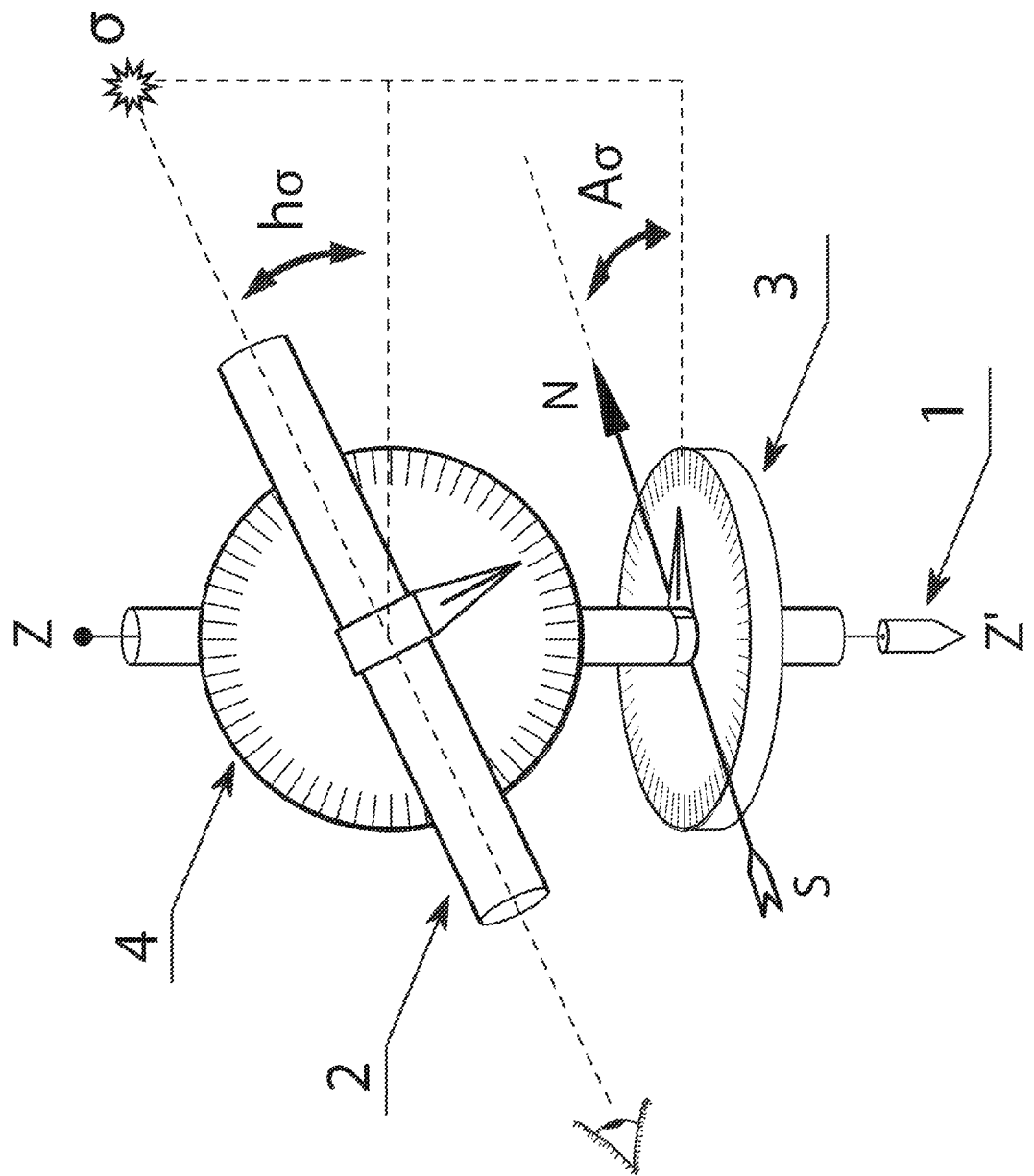
FIG. 4 shows an exemplary apparatus to determine the azimuth.

FIG. 4 shows an exemplary apparatus to determine the azimuth. In FIG. 4:

zz' is the zenith-nadir direction (the vertical, the plumb bob is shown at the bottom of the page)

σ is the celestial body in view;

hσ is the elevation of the celestial body over the horizon;

1 is the orientation unit relative to the local horizon of the vertical;

2 is the optical aiming unit to aim at point light sources;

3 is the horizontal angle measurement unit;

4 is the elevation measurement unit;

(The time measurement unit and computational unit are not shown). The apparatus includes an orientation unit to orient relative to the local horizon or vertical 1, an optical unit to aim at point light sources 2, a horizontal angle measurement unit 3, an elevation measurement unit 4, a time measurement unit and a computation unit, the orientation unit, the aiming unit, the angle measurement unit and the time measurement unit being connected to the computation unit. The computation unit is capable of calculating site azimuth, latitude, and local star time using horizontal and elevation angles of point light sources in the form of celestial bodies, as well as measurement times.

To increase measurement accuracy, the aiming block 2 (to aim at point light sources) can be equipped with a mechanism to change line of sight-direction, which can be equipped with gears able to aim at visible point light sources according to commands of the computation device, such that the observed objects would be in the field of view of the aiming unit.

To make measurements automatic, the aiming unit 2 can be capable of aiming the line of sight directly at observed objects following commands of the computation unit, which have been produced based on the photo sensor in the aiming unit. The sensor can be a CCD or a CMOS imaging array, or other position image sensors.

To compensate for light aiming errors and to speed up measurements, the aiming unit 2 can be capable of fixing headings to two or more point light sources at the same time, and in addition, capable of measuring angles in the same sight field without changing the direction of the line of sight.

One or more check points CP in the form of a non-movable point light source, which can be selected from the surrounding scenery (street lights, beacons etc) or made in the form of a special celestial body-imitated point light source marker at a distance from the aiming unit, can be additionally included in the apparatus.

To compensate for point light source—aiming errors, the apparatus of azimuth determination may be aimed at the point light source such that the point light source would be in the apparatus field of view, rather than having the apparatus is aimed exactly at the point light source. Aiming unit 2 can be capable of measuring angles between the actual direction to the observed object and the apparatus line of sight, and the computation unit can be capable of considering this angle in calculating the determined parameters.

Aiming unit 2 can be additionally equipped with an option of digital imaging the sight field of the optical system, and the computation unit can be capable of calculating angles between the actual direction to the observed object and the apparatus line of sight based on such images; these angles are considered in calculation of the determined parameters.

Aiming unit 2 can be made capable of observing two or more distant from each other areas of celestial sphere in the single field of the apparatus.

Aiming unit 2 can be additionally equipped with capability of synchronous fixation of two or more point light source headings in the single field without changing the direction of the line of sight. The point light sources can be located at distant from areas of the celestial sphere, and the computation unit can be capable of calculating the determined parameters based on these measurements.

The apparatus can further comprise a reception unit to receive radio signals of Universal Time. The reception unit can be signally connected to the computation unit, and the computation unit can be able to process Universal Time signals.

Figure 5:
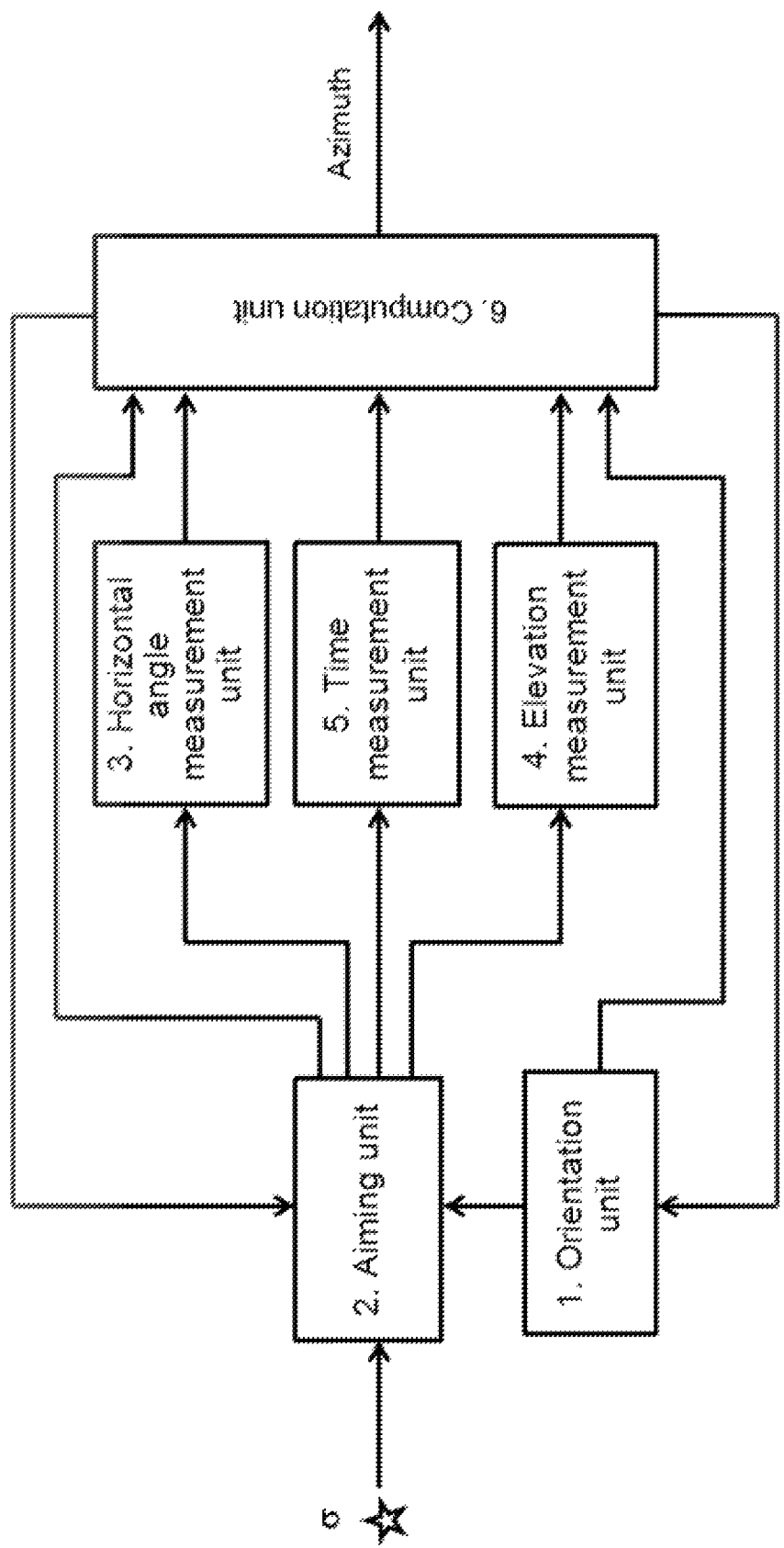
FIG. 5 shows general block diagram of an apparatus to determine the azimuth.

FIG. 5 shows general block diagram of an apparatus to determine the azimuth. In FIG. 5:

σ is the celestial body in view;
1 is the orientation unit relative to the local horizon of the vertical;
2 is the optical aiming unit to aim at point light sources;
3 is the horizontal angle measurement unit;
4 is the elevation measurement unit;
5 is the time measurement unit;
6 is the computation unit The apparatus includes an orientation unit to orient relative to the local horizon or vertical 1, an optical unit to aim at point light sources 2, a horizontal angle measurement unit 3, an elevation measurement unit 4, a time measurement unit 5 and a computation unit 6, the orientation unit, the aiming unit, the angle measurement unit and the time measurement unit being connected to the computation unit. The computation unit is capable of calculating site azimuth, latitude, and local star time using horizontal and elevation angles of point light sources in the form of celestial bodies, as well as measurement times.

The proposed method and apparatus enable to eliminate limitations of devices known in the art and have low sensitivity to measurement errors and interference.

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method of determining an azimuth comprising:
fixing an azimuth determination apparatus on an object and orienting the azimuth determination apparatus to align it with the local horizon or the vertical line;
selecting at least two currently visible celestial bodies that have known coordinates;
sequentially aiming the line of sight at celestial bodies;
measuring elevation angles over the horizon or zenith distances to the visible celestial bodies;
measuring horizontal angles between the visible celestial bodies;
recording measurement times;
calculating local star time, current location latitude and azimuth based on the elevation angles, the horizontal angles and the measurement times.

2. The method of claim 1, further comprising aiming a measurement unit at the visible celestial bodies such that an observed object will be in the apparatus' field of view, and angles between the actual direction to the visible celestial bodies and the line of sight are used to calculate a correction to the azimuth.

3. The method of claim 1, further comprising:
aiming the line of sight sequentially aimed at the selected celestial bodies, and measuring (a) elevation angles over the horizon or (b) celestial bodies zenith ranges,
measuring horizontal angles between the celestial bodies;
recording the measurement times are recorded;
adjusting settings of the elevation measurement unit, the horizontal angle measurement unit, and the aiming unit;
observing the celestial bodies are observed at new settings; and
calculating the local star time, the current location latitude and the azimuth based on both settings.

4. The method of claim 1, wherein the visible celestial bodies are selected such that horizontal angles between them will be at least 60 but no more than 120 degrees.

5. The method of claim 1, wherein the visible celestial bodies are selected such that elevations over the horizon will be at least 10 but no more than 80 degrees.

6. The method of claim 1, wherein recording of the measurement times is based on Universal Time scale, and further comprising calculating current location longitude.

7. The method of claim 1, wherein a main celestial body is selected such that angular distance of the selected celestial body from the celestial Pole is no more than 10 degrees, and auxiliary celestial bodies are selected such that they are at least 25 degrees farther from the celestial Pole than the main selected celestial body, and wherein current location latitude and azimuth is determined based on the main celestial body.

8. The method of claim 7, wherein observation of celestial bodies is done in the following order: auxiliary celestial body—main celestial body—main celestial body—auxiliary celestial body.

9. The method of claim 1, further comprising:
selecting one or more natural or purposely installed point light sources in the form of check points within the surroundings, the azimuth of heading to which is to be determined;
aiming the line of sight at the check points;

measuring horizontal angles between the visible celestial bodies and the check points, elevations over the horizon or zenith ranges of the check points
recording measurement times;
calculating heading azimuths to the check points.

10. The method of claim 9, further comprising:
changing settings of the elevation measurement unit, the horizontal angle measurement unit, and the aiming unit, and observing the visible celestial bodies and check points with new settings;
measurement times are recorded; and
determining local star time, latitude and heading azimuth to check points based on the two sets of measurements.

11. The method of claim 9, further comprising:
selecting one main celestial body among visible celestial bodies, is selected such that angular distance of the main celestial body to the celestial Pole is no more than 10 degrees;
selecting auxiliary celestial bodies that are at least 25 degrees farther from the celestial Pole than the main celestial body; and
observing the auxiliary celestial bodies and check points according to the following order: check point—auxiliary celestial body—main celestial body—main celestial body—auxiliary celestial body—check point.

12. The method of claim 1, wherein elevation angles and zenith ranges of multiple celestial bodies are synchronously generated.

13. An apparatus for azimuth determination comprising:
an orientation unit for orienting the apparatus relative to a local horizon or a vertical line;
an optical unit adapted to be aimed at celestial point light sources;
a horizontal angle measurement unit;
an elevation measurement unit;
a time measurement unit; and
a computation unit receiving signals from the orientation unit, the optical unit, the horizontal angle measurement unit, the time measurement unit and the elevation measurement unit;
wherein the computation unit is capable of calculating azimuth relative to true North, latitude and local star time based on measurements of horizontal and elevation angles of the point light sources and based on measurement times.

14. The apparatus of claim 13, wherein an aiming unit includes a mechanism for changing line of sight direction.

15. The apparatus of claim 14, wherein the mechanism for changing line of sight direction includes gears for aiming at observed point light sources in response to commands of a computation unit, such that the point light sources would be in a field of view of the aiming unit.

16. The apparatus of claim 14, wherein the aiming unit aims at the point light sources based on commands from the computation unit, the commands generated based on signals from photosensors.

17. The apparatus of claim 13, wherein the aiming unit simultaneously determines directions to multiple point light sources.

18. The apparatus of claim 17, wherein the aiming unit simultaneously determines directions to multiple point light sources in the same field of view without changing the line of sight direction of the aiming unit.

19. The apparatus of claim 13, wherein the aiming unit measures angles between an actual direction to the observed point light source and the line of sight, and wherein the local star time, latitude and heading azimuth are calculated based on the measurements.

20. The apparatus of claim 13, wherein the aiming unit is capable of observing multiple point light sources in a celestial sphere that are in the same field of view.

21. The apparatus of claim 20, wherein the aiming unit synchronously fixes in the same field without changing directions of the line of sight to two or more point light sources disposed at celestial sphere areas distant from each other, and said computation unit is capable of computing the local star time, latitude and heading azimuth based on these measurements.

22. The apparatus of claim 13, wherein the apparatus receives radio signals corresponding to Universal Time, and the computation unit calculates current location longitude based on the Universal Time and the local star time, latitude and heading azimuth.

23. An apparatus for azimuth determination comprising:
an orientation unit for orienting the apparatus relative to a local horizon or a vertical line;
an optical unit adapted to be aimed at point light sources;
a horizontal angle measurement unit;
an elevation measurement unit;
a time measurement unit; and
a computation unit receiving signals from the orientation unit, the optical unit, the horizontal angle measurement unit and the elevation measurement unit;
wherein the computation unit is capable of calculating azimuth, latitude and local star time based on measurements of horizontal and elevation angles of the point light sources and based on measurement times,
wherein a stationary point light source is used as one or more check points that imitate a celestial body.

24. An apparatus for azimuth determination comprising:
an orientation unit for orienting the apparatus relative to a local horizon or a vertical line;
an optical unit adapted to be aimed at point light sources;
a horizontal angle measurement unit;
an elevation measurement unit;
a time measurement unit; and
a computation unit receiving signals from the orientation unit, the optical unit, the horizontal angle measurement unit and the elevation measurement unit;
wherein the computation unit is capable of calculating azimuth, latitude and local star time based on measurements of horizontal and elevation angles of the point light sources and based on measurement times,
wherein the aiming unit generates a digital image of a field of view of its optical system, and the computation unit calculates angles between an actual direction to the observed object and a direction of the line of sight from the digital image, and wherein the local star time, latitude and heading azimuth are calculated based on the calculations.

* * * * *